(12) United States Patent
Eping et al.

(10) Patent No.: US 8,104,747 B2
(45) Date of Patent: Jan. 31, 2012

(54) HUMIDIFIER

(75) Inventors: Udo Eping, Darmstadt (DE); Franz Schneider, Viernheim (DE); Klaus Leister, Weinheim (DE); Stefan Geiss, Laudenbach (DE); Joachim Wolf, Weinheim (DE); Volker Senne, Weinheim (DE); Harald Ehrentraut, Darmstadt (DE); Bernd Altmueller, Birkenau (DE)

(73) Assignee: Carl Freudenberg KG, Weinheim (DE)

( * ) Notice: Subject to any disclaimer, the term of this patent is extended or adjusted under 35 U.S.C. 154(b) by 751 days.

(21) Appl. No.: 11/990,553

(22) PCT Filed: Aug. 18, 2006

(86) PCT No.: PCT/EP2006/008179
§ 371 (c)(1),
(2), (4) Date: Aug. 4, 2008

(87) PCT Pub. No.: WO2007/020107
PCT Pub. Date: Feb. 22, 2007

(65) Prior Publication Data
US 2009/0108476 A1 Apr. 30, 2009

(30) Foreign Application Priority Data
Aug. 19, 2005 (DE) .......................... 10 2005 039 252
Mar. 30, 2006 (DE) .......................... 10 2006 015 236

(51) Int. Cl.
*F24F 6/00* (2006.01)

(52) U.S. Cl. ............................................ 261/83; 261/95
(58) Field of Classification Search .................... 261/83, 261/95
See application file for complete search history.

(56) References Cited

U.S. PATENT DOCUMENTS

| 3,952,181 | A | * | 4/1976 | Reed .............................. 392/397 |
| 4,054,122 | A | * | 10/1977 | Reed .............................. 126/113 |
| 4,367,734 | A |   | 1/1983 | Benthin |
| 6,887,304 | B2 |  | 5/2005 | Stroh et al. |
| 2010/0193975 | A1 | * | 8/2010 | Kammann et al. .............. 261/75 |

FOREIGN PATENT DOCUMENTS

| CA | 2021757 | 8/1991 |
| CA | 2464919 | 5/2003 |
| EP | 1096182 | 5/2001 |
| GB | 2082921 | 3/1982 |
| JP | 2002301158 | 10/2002 |
| JP | 2003065566 | 3/2003 |
| JP | 2003161473 | 6/2003 |
| JP | 2004028490 | 1/2004 |
| WO | WO 02/066106 | 8/2002 |
| WO | WO 02/074423 | 9/2002 |

* cited by examiner

*Primary Examiner* — Robert J Hill, Jr.
*Assistant Examiner* — Christopher P Jones
(74) *Attorney, Agent, or Firm* — Pearl Cohen Zedek Latzer, LLP (57) ABSTRACT

A humidifier including a housing which is used to receive a humidifier module. The housing can be connected by the housing cover and is provided with at least one first sealing element, which seals the humidifier module in relation to the housing. The humidifier module is arranged in an axially displaceable manner on the first sealing element.

9 Claims, 9 Drawing Sheets

HUMIDIFIER

This application is a national phase of International Application No. PCT/EP2006/008179, filed Aug. 18, 2006, which claims priority to DE 10 2005 039 252.0, filed Aug. 19, 2005 and DE 10 2006 015 236.0, filed Mar. 30, 2006.

The present invention relates to a humidifier, including a housing for receiving a humidifier module, the housing being closable by housing covers, and at least one first sealing element being provided, which seals the humidifier module in relation to the housing.

BACKGROUND

Humidifiers of this type are known from JP 2004028490 A. They are used in fuel cells, in particular in PEM fuel cells. These fuel cells require humidified air for operation to prevent the fuel cell diaphragm from drying out. The housing of the humidifier is frequently a cylindrical body in which at least one humidifier module is situated. The housing is constructed in multiple parts and includes a cylindrical housing section, on which housing covers are fastened on the two end faces. The connection point of housing section and housing cover is frequently produced using O-rings, which are situated in a groove of the housing section or the humidifier module. It is disadvantageous that there are high tolerance requirements for the required tightness. Furthermore, the humidifier is subject to temperature oscillations, which result in differing thermal expansions because of different materials for housing and humidifier modules. These result in stresses or leaks in fixedly clamped humidifier modules.

The present invention is based on the object of providing a humidifier which allows stress-free integration of the humidifier module.

The humidifier module presses against the first sealing element in such a way that it may move axially and/or radially in a sliding manner. The sealing element presses on the one hand against the external circumference of the humidifier module to form a seal and, on the other hand, the contact pressure of the sealing element on the humidifier module is selected in such a way that the humidifier module is movable in the axial direction with high tightness and thus forms a movable bearing seal, to compensate for thermal expansions or tolerances in regard to the diameter in particular, for example. A compensation space is provided for this purpose, which is delimited by the housing cover, the humidifier module, and the first sealing element. The humidifier module may extend into this compensation space. The humid air flow and the air flow to be humidified on the one hand, and these two air flows are sealed toward the surroundings by the sealing element. Pressure differences up to approximately 100 millibar occur between the two air flows, and pressure differences up to approximately 2.5 bar occur between the air flows and the environment, which are reliably sealed by the sealing system according to the present invention. The humidifier module may be implemented as round or rectangular. Round humidifier modules have particularly favorable flow guiding, and rectangular humidifier modules have particularly favorable space usage. The housing cover may be fastened to the housing screw connections. Screw connections may be produced particularly simply. A precisely defined contact pressure of the cover may be achieved with screw connections by selecting specific tightening torques, which is relevant for the first seal in particular. The normal force which acts radially on the humidifier module via the sealing element results from the tightening torque. The torque is selected in such a way that an axial displacement is possible in the event of thermal expansions.

The system according to the present invention is advantageous in particular for unsheathed humidifier modules. Humidifier modules having exchanger faces made of hollow fibers usually have a sheath in which the hollow fibers are embedded and fixed on both end faces to form a seal by a casting compound, such as an artificial resin (e.g., epoxide resin). These humidifier modules having a sheath are inserted and fastened in a humidifier housing. The hollow fibers may also be situated directly in a housing. A humidifier of this type includes a housing having covers and seal and at least one bundle made of hollow fibers which are bonded to one another by an artificial resin on both end faces. A greater variety of shapes thus results and the humidifier modules may be tailored to any housing shape. For this purpose, the hollow fibers are situated in the housing and closed on the end faces; the fixing using artificial resin is subsequently performed directly in the housing. However, shrinkage of the hollow fiber bundle fixed using artificial resin occurs in this method, so that a peripheral gap may result between hollow fiber bundle and housing. This gap is reliably sealed by the seal configuration according to the present invention.

The humidifier module may have a peripheral shoulder on a first end face; a peripheral projection may be situated in the housing around the internal circumference in the area of the shoulder and a second sealing element being situated between shoulder and projection and the housing having a second peripheral projection around the internal circumference, which is assigned to the second end face of the humidifier module, the second projection delimiting an installation chamber in which the first sealing element is situated. In the embodiment according to the present invention, the first seal is situated either on the humidifier module or in the housing and the humidifier module is inserted into the housing. The first sealing element is then placed in the installation chamber. The humidifier module is insertable particularly simply into the housing in this embodiment and the housing and the humidifier module have a simple construction. The sealing point of the second sealing element forms a fixed bearing and the sealing point of the first sealing element forms a movable bearing, which allows length changes of the humidifier module due to temperature changes, for example, to be compensated for. A second sealing element may be situated on each side of the shoulder of the humidifier module. In the area of the second sealing element, the humidifier module thus has no or only slight direct contact with the surrounding housing. There is also no direct contact with the cover due to the elastomeric body. A system decoupled from vibrations thus results, whereby noise development is avoided. The second sealing element may be formed by an elastomeric body. The elastomeric body may be implemented as an O-ring or as a coating made of elastomeric material. O-rings have been known for some time as static sealing elements and are available inexpensively. O-rings are available in greatly varying diameters and cross sections.

The humidifier module may be situated in such a way that it is movable in a sliding manner on both sealing elements. In this embodiment, the humidifier module is guided on both sides by sealing elements, which are clamped in the housing in such a manner that a radial contact pressure results on the humidifier module, whereby axial displacement is prevented. However, this connection allows axial displacement upon the occurrence of thermal stresses. Furthermore, tolerances may be compensated for in a wide range by this configuration.

Both sealing elements may have a planar design on their flank pointing inward and their flank pointing outward. Because the end faces of the sealing elements also have a planar design, the sealing element has an essentially rectangular cross section. Twisting of the sealing element during the mounting of the sealing element in the receptacle is thus prevented. Furthermore, this configuration allows simple assembly of the humidifier module. Alternatively, in this embodiment, the sealing element may also be situated in the receptacle after the mounting of the humidifier module, whereby the mounting is additionally simplified. Because of the rectangular shaping, the sealing element essentially completely fills up the receptacle and even slight axial forces applied by the housing cover result in a high tightness at the connection point to be sealed. The tolerance requirements are less than with O-ring seals. The sealing element may have a peripheral protrusion on the end face facing toward the housing cover. The protrusion is preferably situated radially outside the mean width, in the area of the flank pointing outward. The mean width is determined by calculating the mean value of the inner width and the outer width of the sealing element. A larger sealing area results in the flank pointing outward due to the protrusion and thus a sealing effect which is once again improved. The sealing element may have a peripheral first depression on the end face facing toward the housing section. The depression results in an improved force action on the flanks of the sealing element and thus an improved sealing action. The sealing element may have a peripheral second depression on the end face facing toward the housing cover. In an advantageous embodiment, the housing cover may have a congruently implemented protrusion, which may be engaged in the depression. The sealing element is thus fixed in its position. The imaginary depth of the lowest point of the second depression may differ from the mean width of the sealing element. The mean width is again determined by calculating the mean value of the inner width and the outer width of the sealing element. Due to this asymmetrical embodiment, an asymmetrical force introduction results through the housing cover into the sealing element. Depending on the embodiment, one of the two flanks, either the internal side or the external side, thus experiences a higher surface pressure. The imaginary diameter of the lowest point of the second depression may be smaller than the mean diameter of the sealing element. The surface pressure on the external side of the sealing element is thus higher than on its internal side. The humidifier module to be sealed, which presses against the internal side of the sealing element, is compressed less in this embodiment, an axial displacement of the humidifier module being made possible. The sealing element may have at least one peripheral sealing bead on the flank pointing inward and/or on the flank pointing outward. In an advantageous embodiment, three sealing beads are situated on the flank pointing inward and also on the flank pointing outward. The sealing beads additionally improve the sealing action of the sealing element with reduced tolerance requirements on the seal geometry. The sealing element may be made of an elastomer having a Shore hardness of less than 70. Sealing elements of this type are simple to mount and may be compressed using simple means.

The first sealing element may be implemented as an X-ring. X-rings have also been known for some time as static sealing elements and are available in various embodiments. In the system according to the present invention, it is advantageous that X-rings achieve a good sealing action at a low compression. The X-rings are thus easily mountable. Furthermore, X-rings compensate for tolerances of the installation chamber because of their geometry.

The first sealing element may have a peripheral sealing lip projecting essentially radially inward. This sealing lip is very mobile in the axial direction and also in the radial direction. This means that the sealing lip bridges large tolerances of the humidifier module in the axial direction or in relation to the diameter and is insensitive to thermal expansions. The sealing lip presses against the external circumference of the humidifier module to form a seal.

At least the housing cover assigned to the first sealing element may have a peripheral protrusion, which presses against the first sealing element. A stronger compression results in this area due to the peripheral bead, and displacement of the material of the sealing element occurs. The contact pressure of the sealing element in the radially adjoining areas thus increases. In this embodiment, the tightness between housing section and humidifier module is once again improved.

The first and/or the second sealing element may be made of EPDM. EPDM is resistant to hot water and vapor and is therefore particularly suitable for use in humidifiers.

BRIEF DESCRIPTION OF THE DRAWINGS

Several exemplary embodiments of the humidifier according to the present invention are explained in greater detail in the following on the basis of the drawings. In the schematic figures.

DETAILED DESCRIPTION

Figure 1:
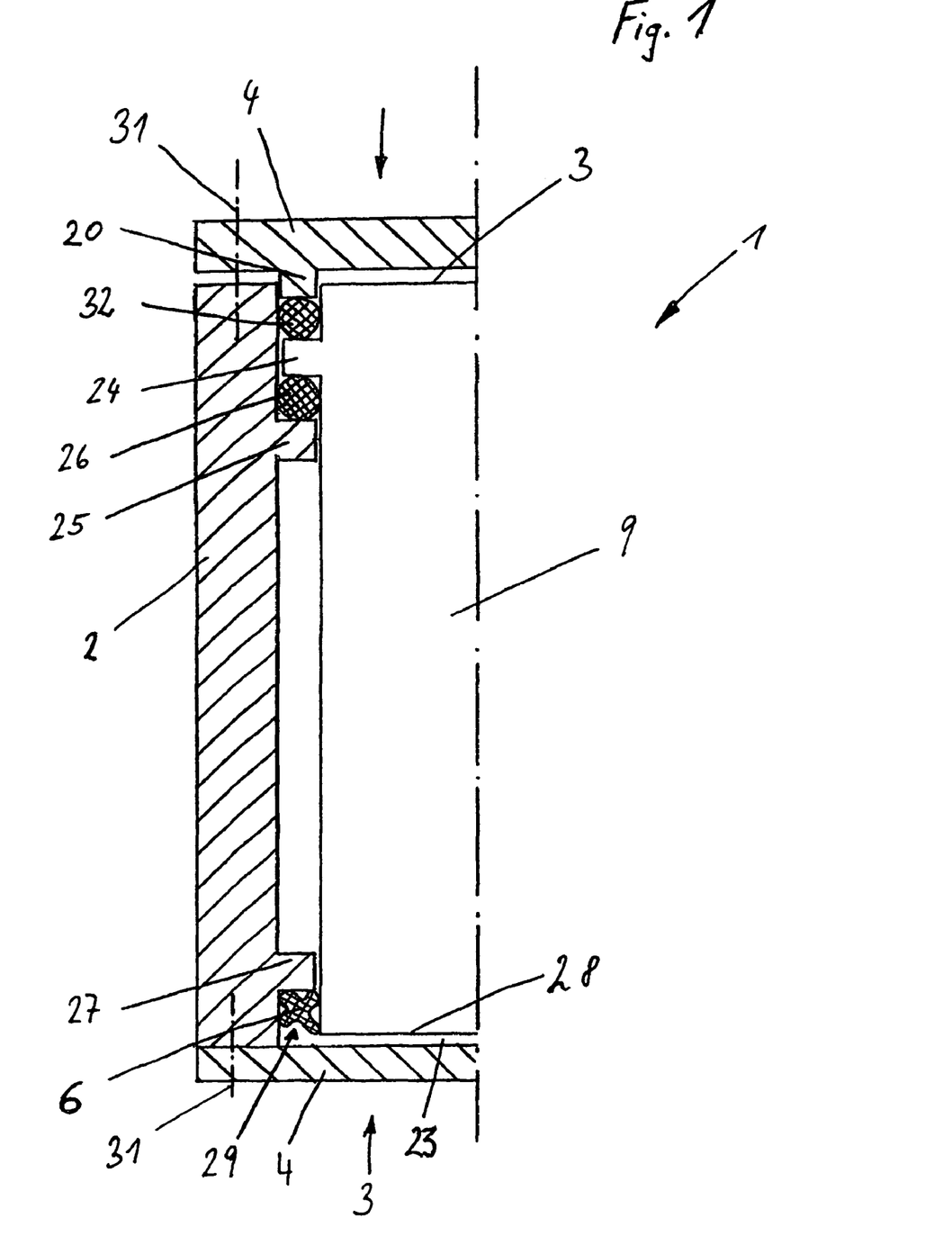
FIG. 1 shows a humidifier according to the present invention having an X-ring.

FIG. 1 shows a humidifier 1, including a housing 2 made of metallic material in which a humidifier module 9 is situated, which is essentially made of plastic. Humidifier module 9 contains hollow fibers for the material exchange. Humidifier module 9, which has a round or rectangular cross section, has a peripheral shoulder 24 on a first end face 3, and housing 2 has a peripheral projection 25 around the internal circumference in the area of shoulder 24. A second sealing element 26, which is implemented in this embodiment as an O-ring, is situated between shoulder 24 and projection 25. Housing 2 has a second peripheral projection 27 around the internal circumference, which is assigned to second end face 28 of humidifier module. Second projection 27 delimits an installation chamber 29, in which a first sealing element 6 is situated, which is implemented in this embodiment as an X-ring. A compensation chamber 23, into which humidifier module 9 may extend, is delimited by housing cover 4, humidifier module 9, and first sealing element 6. Housing 2 is closable on its two end faces 3, 28 by housing covers 4 using screw connections 31. Housing cover 4 assigned to first end face 3 has a protrusion 20, which presses against shoulder 24 of humidifier module 9 and thus compresses second sealing element 26 in the axial direction. An elastomeric body 32 is situated between protrusion 20 and shoulder 24, which is implemented here as an O-ring and is primarily used for vibration damping. Humidifier 1 is used in PEM fuel cells to humidify the fuel-cell intake air.

Figure 2:
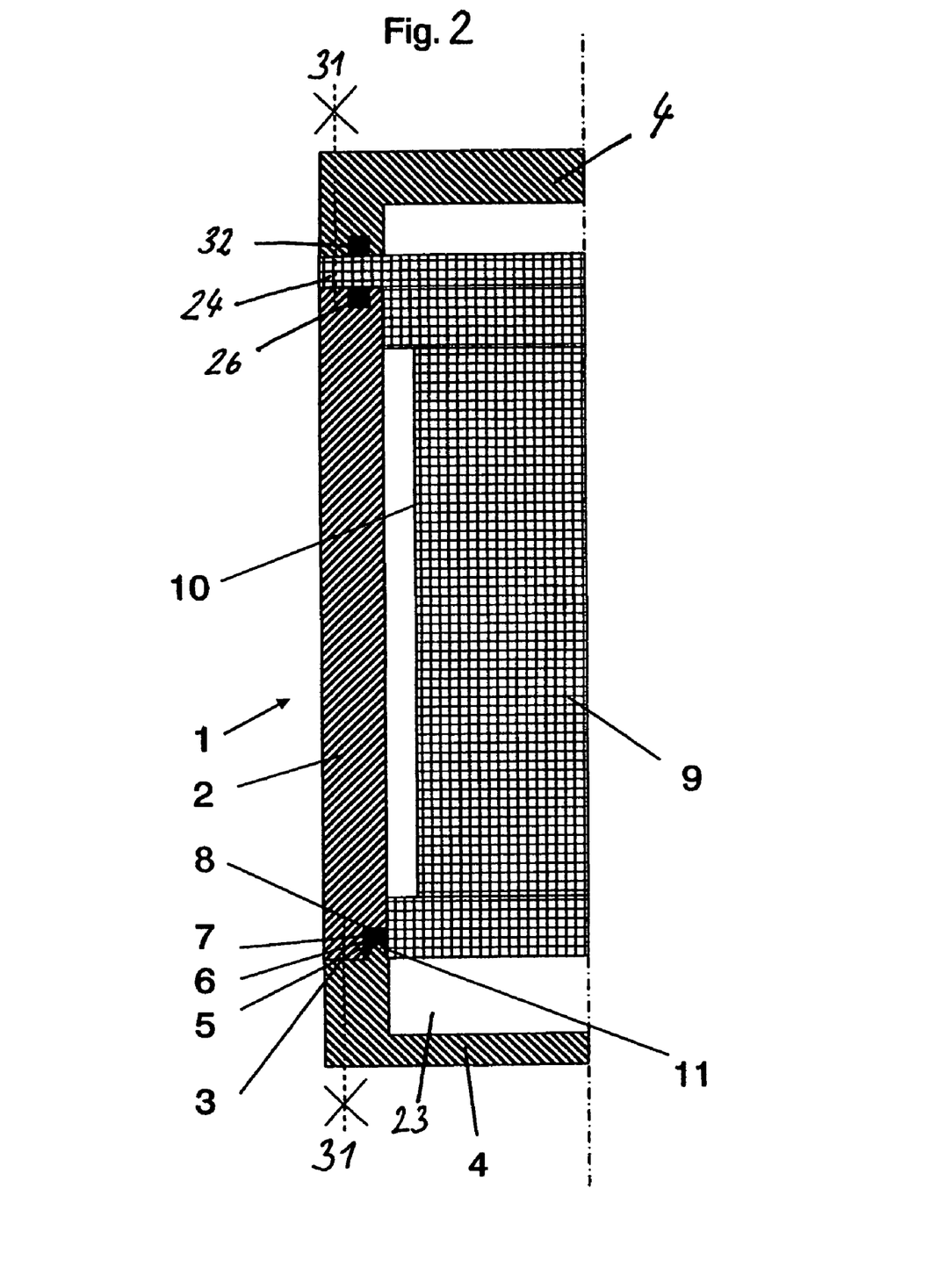
FIG. 2 shows a humidifier according to the present invention having a rectangular sealing element.

FIG. 2 shows a humidifier 1 according to FIG. 1 having a cylindrical or rectangular housing 2 on whose one end face 3 a housing cover 4 is situated, housing section 2 and housing cover 4 being screwed together. A receptacle 5 for a sealing element 6 is situated on end face 3 of housing section 2 facing toward housing cover 4.

Figure 3:
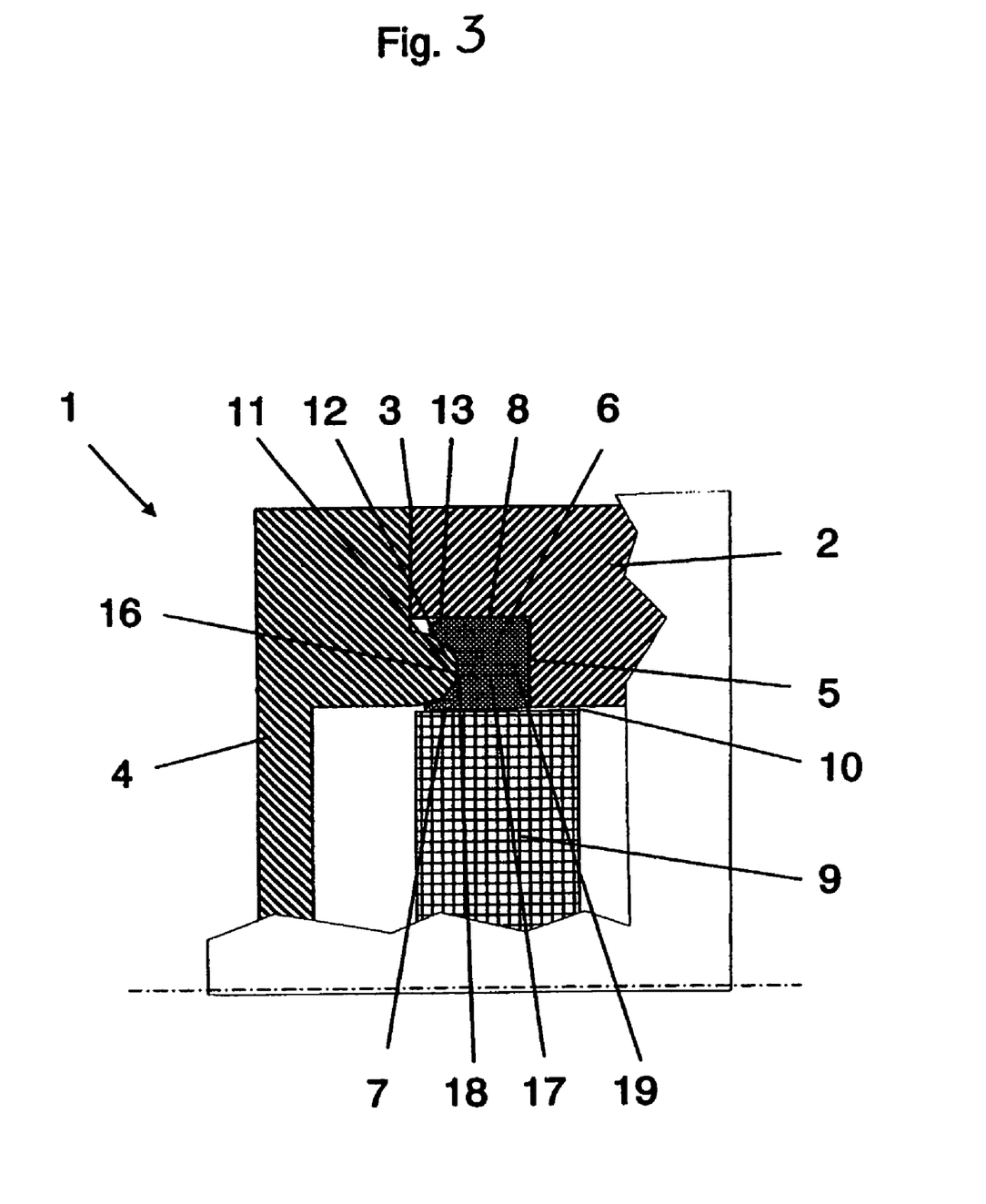
FIG. 3 shows a sealing element situated in the humidifier.

FIG. 3 shows a detail of humidifier 1 described in FIG. 2. First sealing element 6 situated in receptacle 5 has a circular or rectangular cross section and has a planar design on its flank 7 pointing inward and its flank 8 pointing outward. A humidifier module 9 is situated in housing section 2, sealing element 6 pressing against external wall 10 of humidifier module 9 to form a seal and thus separating a first medium, which flows through humidifier module 9 and around the hollow fibers situated in humidifier module 9, from a second medium, which flows through the hollow fibers. Housing cover 4 has a peripheral protrusion 11 and sealing element 6 has a congruently shaped second depression 16, which engages in protrusion 11. The depression is situated on sealing element 6 in such a way that imaginary width 17 of lowest point 18 of second depression 16 differs from mean width 19 of sealing element 6. In this embodiment, imaginary width 17 of lowest point 18 of second depression 16 is less than mean width 19 of sealing element 6. Mean width 19 is determined by calculating the mean value of the inner width (for example, internal diameter) and the outer width (for example, external diameter) of sealing element 9. Sealing element 6 also has a peripheral protrusion 13 on end face 12 facing toward housing cover 4, which is situated adjacent to second depression 16. Sealing element 6 is made of an elastomer having a Shore hardness of less than 70.

Figure 4:
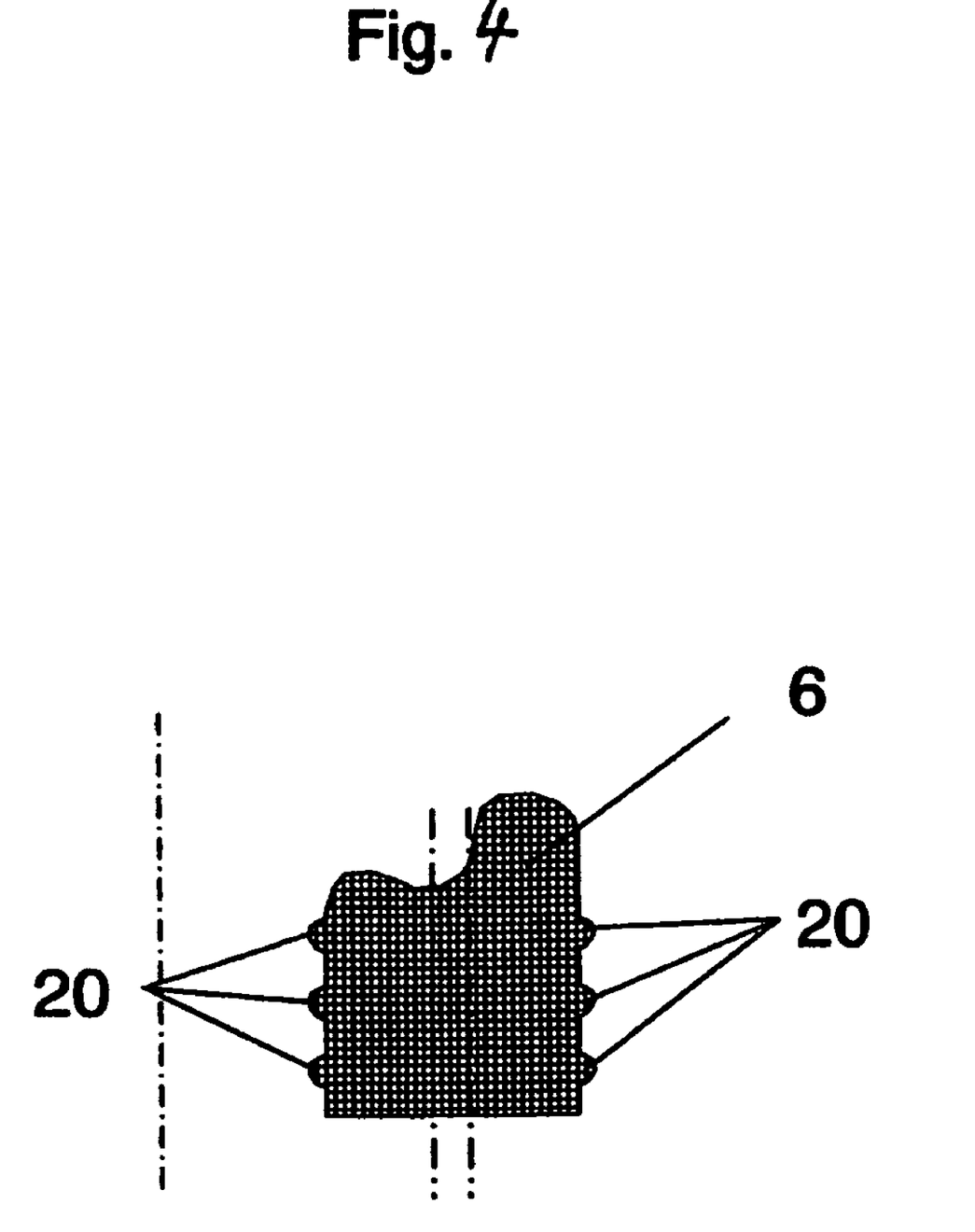
FIG. 4 shows a sealing element having peripheral beads.

FIG. 4 shows a sealing element 6 according to FIG. 3, sealing element 6 additionally having three peripheral sealing beads 20, which are made of uniform material and implemented in one piece with sealing element 6, in each case on the flank pointing inward and on the flank pointing outward.

Figure 5:
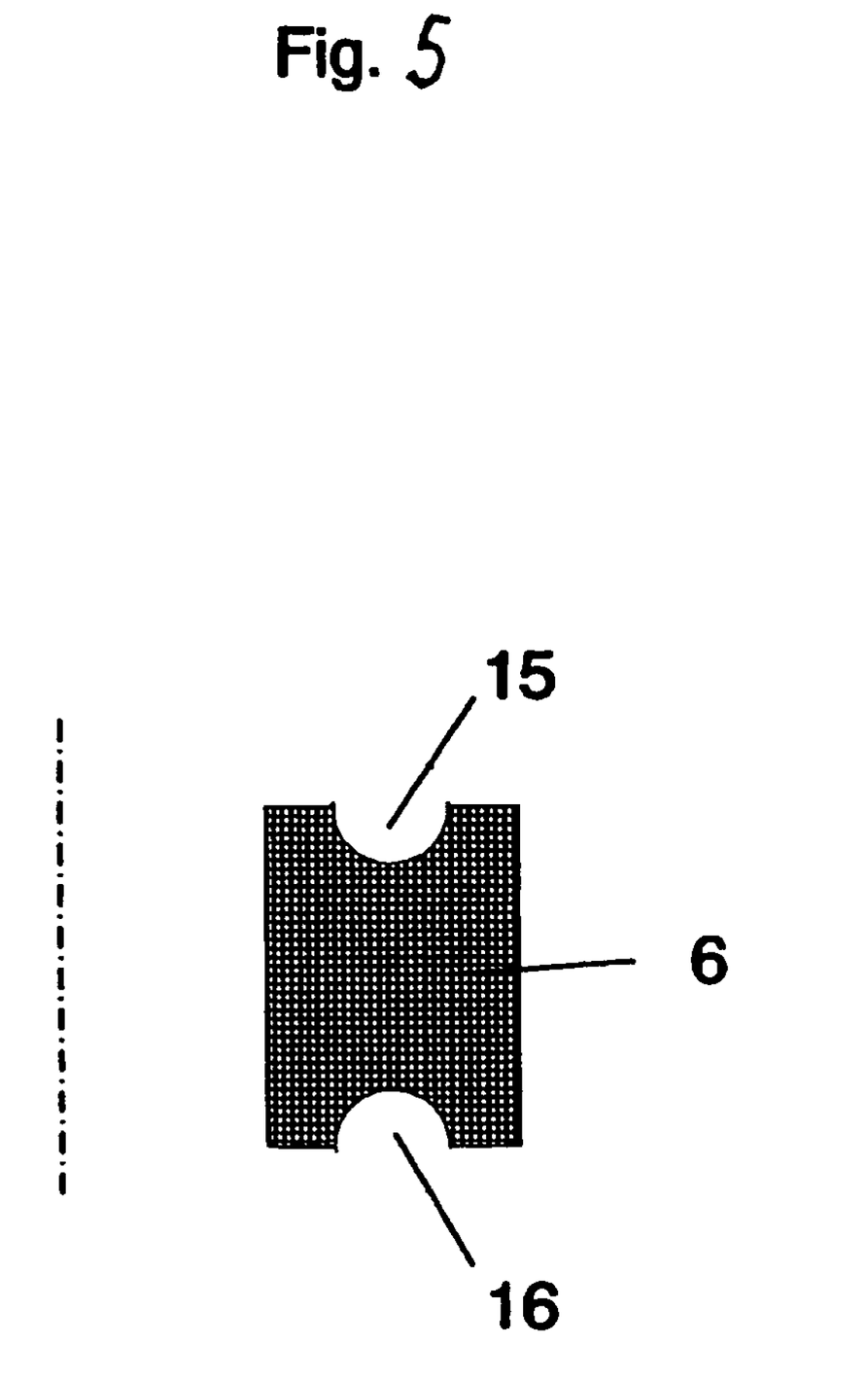
FIG. 5 shows a sealing element having depressions on both sides.

FIG. 5 shows a sealing element 6 according to FIG. 3, sealing element 6 having a first peripheral depression 15 on the end face facing toward housing section 2 and a second depression 16 on the end face facing toward the housing cover. Sealing element 6 is essentially implemented as rectangular.

Figure 6:
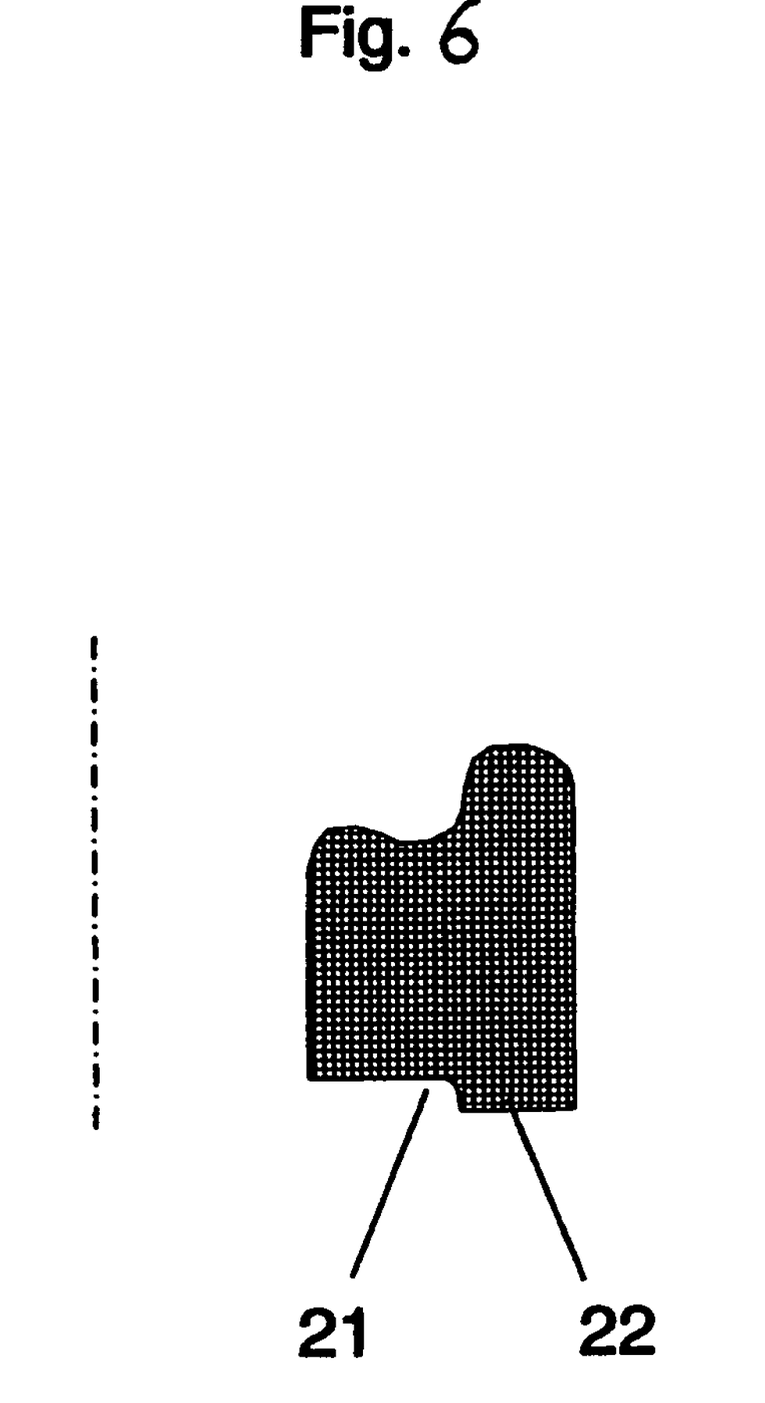
FIG. 6 shows a sealing element having a mounting edge.

FIG. 6 shows a sealing element 9 according to FIG. 3, sealing element 6 having a peripheral recess 21 on the end face facing toward housing section 2. Protrusion 22 thus resulting is capable of engaging in a congruently shaped groove of receptacle 5 situated in housing section 2 and thus simplifying the assembly.

Figure 7:
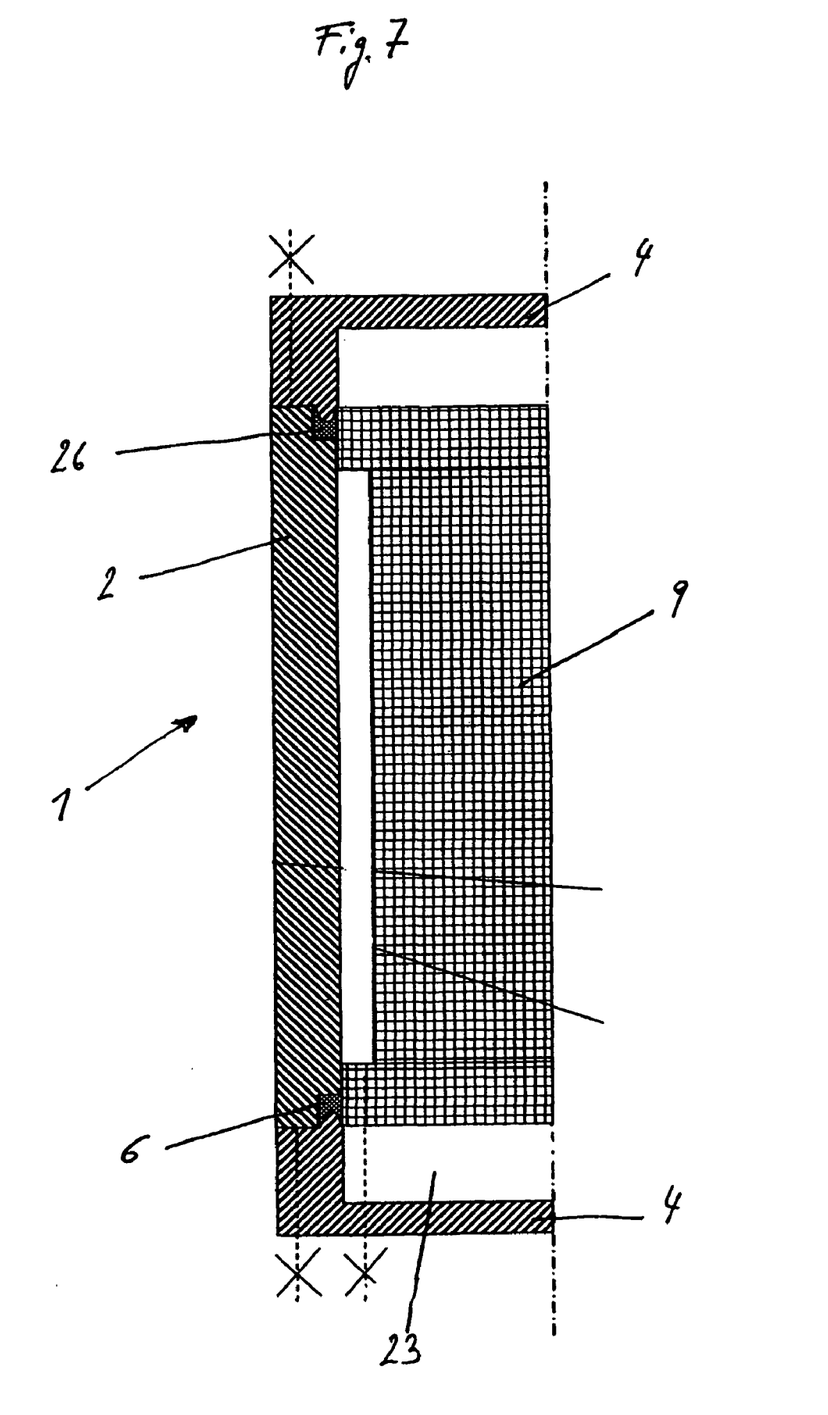
FIG. 7 shows a humidifier module clamped in such a way that it is axially displaceable on both sides.

FIG. 7 shows a humidifier 1 according to FIG. 2 in which both sealing elements 6, 26 are situated in such a manner that humidifier module 9 is movable in a sliding manner axially on both sealing elements 6, 26. For this purpose, second sealing element 26 is implemented congruently to first sealing element 6.

Figure 8:
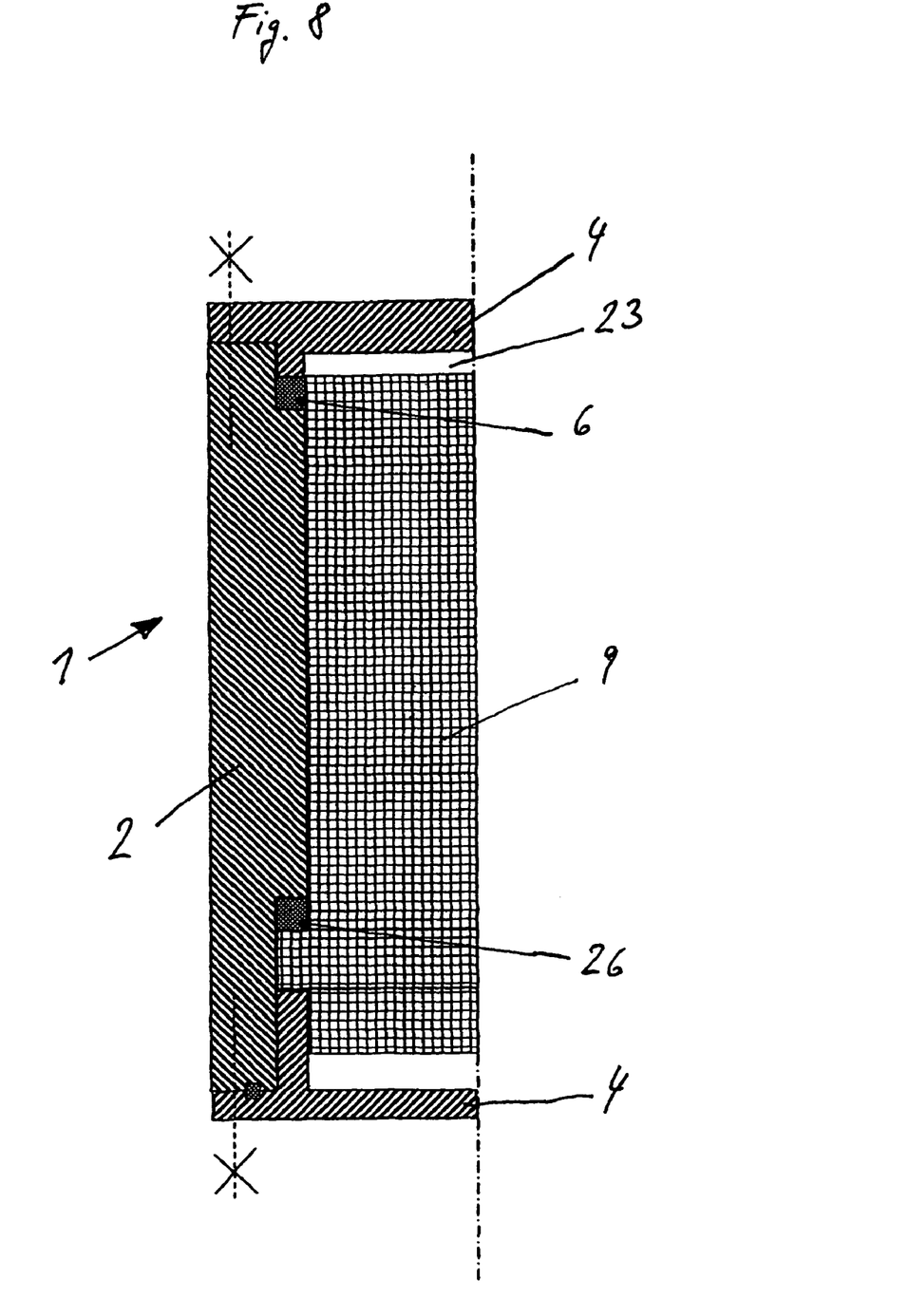
FIG. 8 shows a humidifier.

FIG. 8 shows a humidifier 1 according to FIG. 1, first sealing element 6 being clamped by housing cover 4 in this embodiment, so that an increased normal force results on the outside edge of humidifier module 9.

Figure 9:
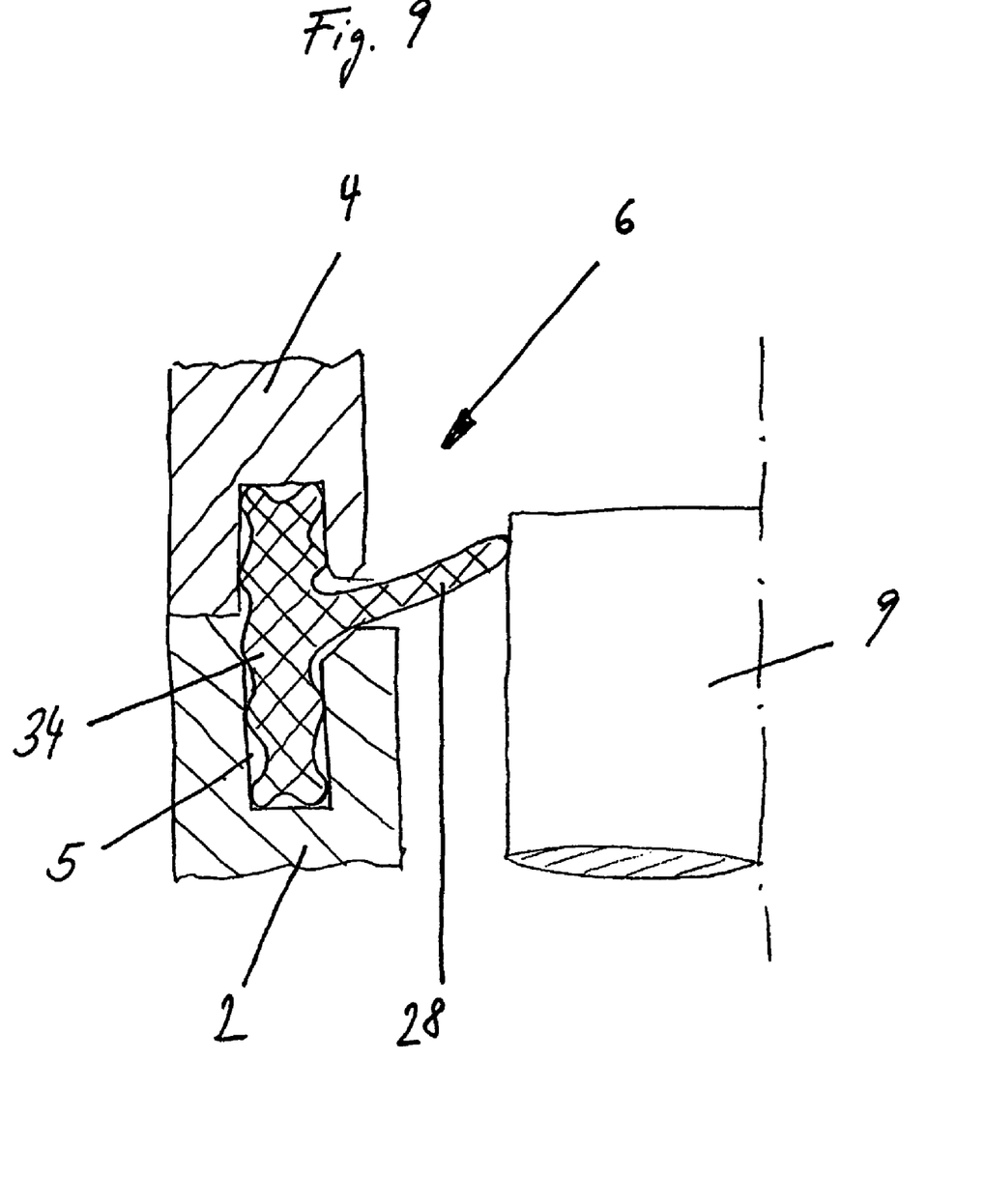
FIG. 9 shows a sealing element having a sealing lip situated around the internal circumference.

FIG. 9 shows, in detail, a first sealing element 6 for a humidifier 1 according to one of the preceding figures. First sealing element 6 has a cylindrical body 34, from which a sealing lip 28 projects radially inward approximately centrally. The length of sealing lip 28 corresponds to half of the length of body 34. First sealing element 6 is inserted into grooves 5 which are introduced into housing 2 and housing cover 4 and is clamped by fastening housing cover 4. First sealing element 6 is made of EPDM in this embodiment.

The invention claimed is:

1. A humidifier, comprising: a housing for receiving a humidifier module, the housing being closable by housing covers; and at least one first sealing element sealing the humidifier module in relation to the housing, the humidifier module pressing against the first sealing element in such a way that the humidifier module is movable in a sliding manner axially and/or radially; wherein the humidifier module has a peripheral shoulder on a first end face; and a peripheral projection is situated in the housing around an internal circumference in the area of the shoulder, a second sealing element being situated between shoulder and projection, and the housing having a second peripheral projection around the internal circumference, which is assigned to the second front face of the humidifier module, the second projection delimiting an installation chamber, in which the first sealing element is situated.

2. The humidifier as recited in claim 1 wherein the housing cover, the humidifier module, and the first sealing element define a compensation chamber.

3. The humidifier as recited in claim 1 wherein the second sealing element is situated on each side of the shoulder of the humidifier module.

4. The humidifier as recited in claim 1 wherein the humidifier module is situated in such a way that it is axially movable in a sliding manner on the first sealing element and the second sealing element.

5. The humidifier as recited in claim 1 wherein the first sealing element has a planar design on a flank pointing inward and a flank pointing outward.

6. The humidifier as recited in claim 1 wherein the first sealing element is implemented as an X-ring.

7. The humidifier as recited in claim 1 wherein the first sealing element has a peripheral sealing lip projecting radially inward.

8. The humidifier as recited in claim 1 wherein the housing cover assigned to the first sealing element has a peripheral protrusion pressing against the first sealing element.

9. The humidifier as recited in claim 1 wherein the first and/or the second sealing element is made of EPDM.

* * * * *